(12) United States Patent
Nakamura et al.

(10) Patent No.: US 11,879,870 B2
(45) Date of Patent: Jan. 23, 2024

(54) METHOD OF MANUFACTURING SENSOR DEVICE AND SENSOR DEVICE

(71) Applicant: KYOCERA Corporation, Kyoto (JP)

(72) Inventors: Shinnosuke Nakamura, Kyoto (JP); Atsuomi Fukuura, Kyoto (JP); Hiroshi Katta, Kashihara (JP)

(73) Assignee: KYOCERA CORPORATION, Kyoto (JP)

( * ) Notice: Subject to any disclaimer, the term of this patent is extended or adjusted under 35 U.S.C. 154(b) by 183 days.

(21) Appl. No.: 17/606,390

(22) PCT Filed: Apr. 22, 2020

(86) PCT No.: PCT/JP2020/017382
§ 371 (c)(1),
(2) Date: Oct. 25, 2021

(87) PCT Pub. No.: WO2020/218369
PCT Pub. Date: Oct. 29, 2020

(65) Prior Publication Data
US 2022/0196610 A1    Jun. 23, 2022

(30) Foreign Application Priority Data
Apr. 26, 2019    (JP) .................. 2019-086563

(51) Int. Cl.
*G01N 29/24* (2006.01)
*G01N 29/02* (2006.01)

(52) U.S. Cl.
CPC ....... *G01N 29/2462* (2013.01); *G01N 29/022* (2013.01); *G01N 2291/0255* (2013.01);
(Continued)

(58) Field of Classification Search
CPC ............ G01N 29/2462; G01N 29/022; G01N 2291/0255; G01N 2291/0256; G01N 2291/0423
(Continued)

(56) References Cited

U.S. PATENT DOCUMENTS 9,322,809 B2    4/2016  Komatsu et al.
9,791,413 B2 *  10/2017 Katta ................. G01N 29/4436
(Continued)

FOREIGN PATENT DOCUMENTS

EP    0542469 A1    5/1993
EP    3104172 A1    12/2016
(Continued)

*Primary Examiner* — Lisa M Caputo
*Assistant Examiner* — Rose M Miller
(74) *Attorney, Agent, or Firm* — Procopio, Cory, Hargreaves & Savitch LLP

(57) ABSTRACT

A sensor device includes a substrate having a substrate surface, a first IDT electrode positioned on the substrate surface, a second IDT electrode positioned on the substrate surface, a waveguide, and a protective film. The waveguide is positioned on the substrate surface and between the first IDT electrode and the second IDT electrode. The waveguide includes a first immobilized layer positioned on the substrate surface and a second immobilized layer positioned on the first immobilized layer. The second immobilized layer is positioned inside an outer edge of the first immobilized layer as seen in a plan view.

13 Claims, 14 Drawing Sheets

(52) U.S. Cl.
CPC ............... *G01N 2291/0256* (2013.01); *G01N 2291/0423* (2013.01)

(58) Field of Classification Search
USPC .......................................................... 73/649
See application file for complete search history.

(56) References Cited

U.S. PATENT DOCUMENTS

| | | |
|---|---|---|
| 10,037,382 B2 * | 7/2018 | Tanaka et al. |
| 10,942,191 B2 * | 3/2021 | Tanaka ..................... G01N 5/02 |
| 11,029,288 B2 | 6/2021 | Kobayashi |
| 2007/0210349 A1 | 9/2007 | Lu et al. |
| 2018/0003708 A1 * | 1/2018 | Nishizono ........ G01N 33/54306 |

FOREIGN PATENT DOCUMENTS

| | | | |
|---|---|---|---|
| JP | 2017028543 | A | 2/2017 |
| WO | 2013108608 | A1 | 7/2013 |
| WO | 2014069063 | A1 | 5/2014 |
| WO | 2016068339 | A1 | 5/2016 |

* cited by examiner

METHOD OF MANUFACTURING SENSOR DEVICE AND SENSOR DEVICE

CROSS-REFERENCES TO RELATED APPLICATIONS

The present application claims priority of Japanese Patent Application No. 2019-86563, filed on Apr. 26, 2019, the entire contents of which are incorporated herein by reference.

TECHNICAL FIELD

The present disclosure relates to a method of manufacturing a sensor device and a sensor device.

BACKGROUND ART

A known surface acoustic wave device has a configuration in which an electrode that generates a surface acoustic wave is covered by a film (see, for example, PTL 1).

CITATION LIST

Patent Literature

PTL 1: Japanese Unexamined Patent Application Publication No. 2017-28543

SUMMARY OF INVENTION

A sensor device according to an embodiment of the present disclosure includes a substrate having a substrate surface, a first IDT electrode positioned on the substrate surface, a second IDT electrode positioned on the substrate surface, a waveguide, and a protective film. The waveguide is positioned on the substrate surface and between the first IDT electrode and the second IDT electrode. The waveguide includes a first immobilized layer positioned on the substrate surface and a second immobilized layer positioned on the first immobilized layer. The second immobilized layer is positioned inside an outer edge of the first immobilized layer as seen in a plan view.

A method of manufacturing a sensor device according to an embodiment of the present disclosure includes a step of forming a metal layer on a substrate. The method includes a step of removing a part of the metal layer to form a first IDT electrode, a second IDT electrode, and a first immobilized layer positioned between the first IDT electrode and the second IDT electrode. The method includes a step of forming a protective film that covers the first IDT electrode, the second IDT electrode, and the first immobilized layer. The method includes a step of removing a part of the protective film to expose at least a part of the first immobilized layer. The method includes a step of forming a second immobilized layer on at least a part of an exposed surface of the first immobilized layer.

DESCRIPTION OF EMBODIMENTS

A surface acoustic wave device detects a change in a state on a waveguide by detecting a propagation state of a surface acoustic wave. It is required to improve the accuracy in detection of the change in the state on the waveguide.

A sensor device 1 (see FIG. 1) according to an embodiment of the present disclosure and a method of manufacturing the sensor device 1 can improve the accuracy in detection of a surface state of a waveguide.

<Function of SAW Sensor>

Figure 1:
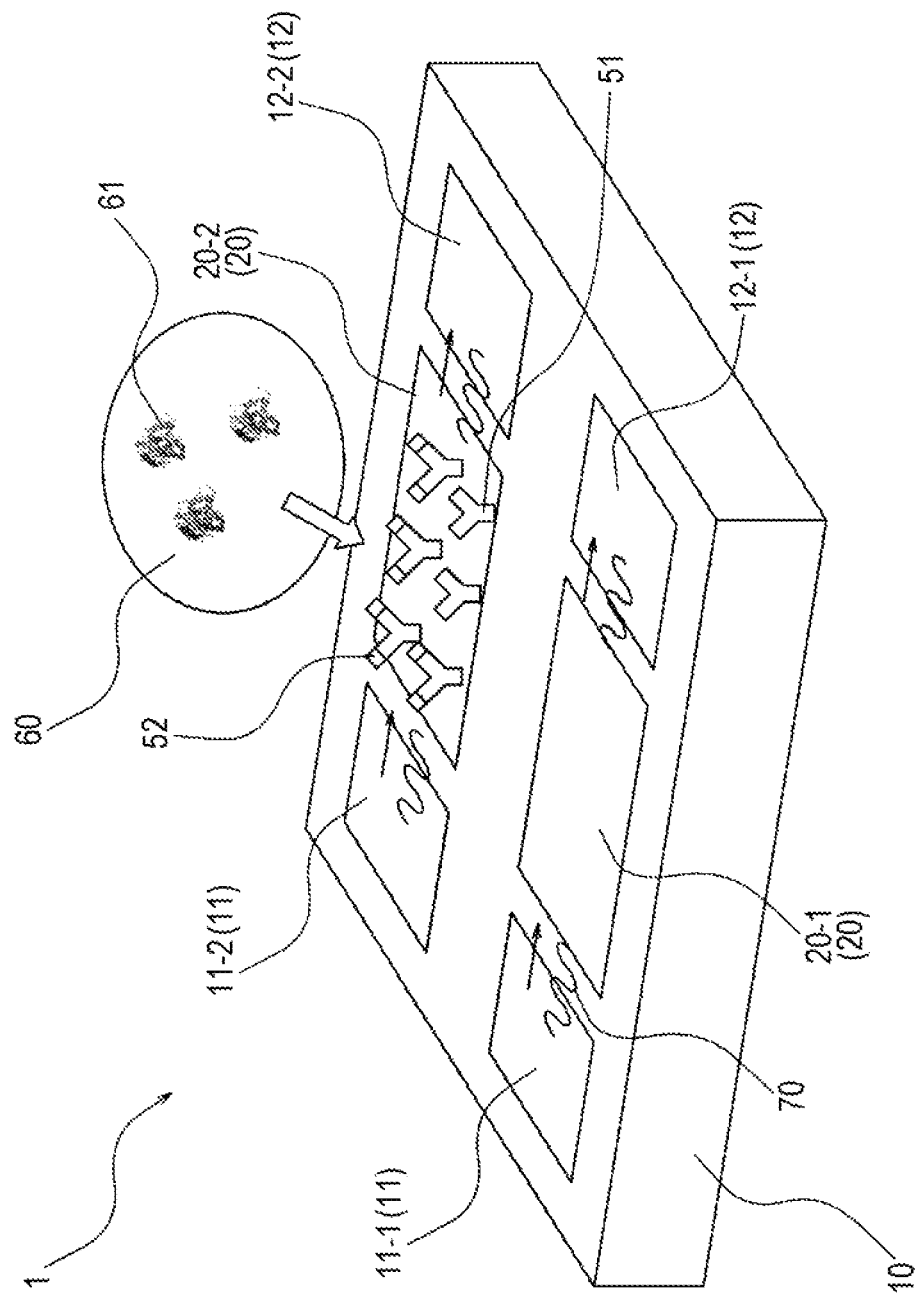
FIG. 1 is a schematic view of a sensor device according to an embodiment.

As illustrated in FIG. 1, the sensor device 1 according to the embodiment includes a substrate 10, a first IDT (interdigital transducer) electrode 11, a second IDT electrode 12, and a waveguide 20. The sensor device 1 functions as a SAW sensor that can detect a change in the propagation characteristics of a surface acoustic wave (SAW) 70. The sensor device 1 inputs an alternate-current electric signal to the first IDT electrode 11. The first IDT electrode 11 generates the SAW 70 along a surface of the substrate 10 based on the input electric signal. The SAW 70 propagates from the first IDT electrode 11 to the second IDT electrode 12. The propagation path from the first IDT electrode 11 to the second IDT electrode 12 includes a surface of the substrate 10 and the waveguide 20 positioned on the surface of the substrate 10. That is, the SAW 70 propagates from the first IDT electrode 11 to the second IDT electrode 12 via the substrate 10 and the waveguide 20. The second IDT electrode 12 outputs an electric signal based on the SAW 70 propagated from the first IDT electrode 11. The electric signal may include a voltage signal or a current signal. It can be said that the first IDT electrode 11 transmits the SAW 70 toward the waveguide 20 and the second IDT electrode 12. It can be said the second IDT electrode 12 receives the SAW 70 from the first IDT electrode 11 and the waveguide 20.

The SAW 70 propagates with predetermined propagation characteristics. The propagation characteristics of the SAW 70 are determined based on the state of the propagation path. The sensor device 1 can detect a change in the state of the propagation path by detecting a change in the propagation characteristics of the SAW 70. The propagation characteristics include, for example, a propagation velocity. The sensor device 1 can detect a change in the propagation velocity as a change in the phase difference between an electric signal input to the first IDT electrode 11 and an electric signal output from the second IDT electrode 12. An electric signal input to the first IDT electrode 11 is also called an "input signal". An electric signal output from the second IDT electrode 12 is also called an "output signal". That is, the sensor device 1 can detect a change in the state of the propagation path based on a change in the phase difference between the input signal and the output signal.

In the sensor device 1 according to the present embodiment, the SAW 70 propagates through the waveguide 20 from the first IDT electrode 11 to the second IDT electrode 12. Accordingly, the state of the propagation path of the SAW 70 is determined based on the state of the waveguide 20.

The state of the waveguide 20 may be specified, for example, by a parameter such as: a mass on a surface of the waveguide 20 or of the vicinity of the surface; or the density, the viscosity, or the like of a substance that is present on the surface or in the vicinity of the surface. The mass, the density, the viscosity, or the like can exert an effect on the propagation characteristics of the SAW 70.

When the sensor device 1 detects a change in the phase difference between an input signal and an output signal, the sensor device 1 can calculate a change in the state of the vicinity of the surface of the waveguide 20 based on the detection result. For example, when a change in the mass of the vicinity of the surface of the waveguide 20 causes a change in the propagation characteristics of the SAW 70 and a change in the phase difference between an input signal and an output signal, the sensor device 1 can calculate the change in the mass of the vicinity of the surface of the waveguide 20. In this case, a calibration curve that specifies the relationship between the amount of change in the phase difference and the amount of change in the mass of the vicinity of the surface of the waveguide 20 may be prepared beforehand. The sensor device 1 may convert the amount of change in the phase difference into an amount of change of the mass of the vicinity of the surface of the waveguide 20 or the like based on the calibration curve.

The sensor device 1 illustrated in FIG. 1 includes a first channel including a pair of a first IDT electrode 11-1 and a second IDT electrode 12-1 and a waveguide 20-1. The sensor device 1 illustrated in FIG. 1 includes a second channel including a pair of a first IDT electrode 11-2 and a second IDT electrode 12-2 and a waveguide 20-2. The number of channels of the sensor device 1 is not limited to two, and may be one, or three or more.

The sensor device 1 detects the phase difference between an input signal and an output signal in each of the first channel and the second channel. The phase differences detected in the first channel and the second channel will be called a "first phase difference" and a "second phase difference", respectively. The phase difference between an input signal and an output signal is based on the propagation velocity of the SAW 70 and the distance from the first IDT electrode 11 to the second IDT electrode 12. If the propagation velocities of the SAW 70 in the first channel and the second channel are the same, the first phase difference is equal to the second phase difference. If the propagation velocities of the SAW 70 in the first channel and the second channel are different, the first phase difference and the second phase difference differ from each other, unless the propagation time of the SAW 70 coincides with an integer multiple of the period of the SAW 70.

The waveguide 20-2 of the second channel includes antibodies on a surface thereof. The antibodies react with specific antigens 61 to be detected. Antibodies that have not reacted with the antigens 61 are called "unreacted antibodies 51". Antibodies that have reacted with the antigens 61 are called "reacted antibodies 52". It is assumed that the waveguide 20 of the second channel includes the unreacted antibodies 51 and the reacted antibodies 52 on the surface thereof. The reacted antibodies 52 of the waveguide 20 of the second channel can be generated by reaction between the unreacted antibodies 51 that have been originally present on the surface of the waveguide 20 and the antigens 61 included in a specimen 60 introduced into the waveguide 20. On the other hand, it is assumed that the waveguide 20-1 of the first channel does not include antigens on the surface thereof.

The reacted antibodies 52 have bound to the antigens 61. Because the reacted antibodies 52 have bound the antigens 61, the mass of the vicinity of the surface of the waveguide 20 is greater than the mass of the unreacted antibodies 51 by the amount of the antigens 61 with which the reacted antibodies 52 have reacted. Accordingly, as the proportion of the reacted antibodies 52 to the antibodies included in the waveguide 20-2 increases, the mass of the vicinity of the surface of the waveguide 20-2 of the second channel increases. That is, the state of the propagation path of the second channel changes in accordance with the change in the proportion of the reacted antibodies 52.

The antibodies may be replaced with aptamers. The aptamers include nucleic acid molecules, peptides, and the like that specifically bind to specific molecules to be detected. When the waveguide 20 includes aptamers on the surface thereof, the mass of the vicinity of the surface of the waveguide 20 increases as the aptamers bind to the specific molecules. The antibodies may be replaced with enzymes. As the enzymes form complexes with specific molecules, the mass increases. The antibodies are not may be replaced with, instead of these examples, another element that can react with a substance to be detected or that can bind to a substance to be detected. The waveguide 20 having an element, such as antibodies, that can react with or bind to a detection target substance, is also called a "reaction unit".

The first channel of the sensor device 1 allows the SAW 70 to propagate through the waveguide 20 and detects the first phase difference. The first phase difference is used as a reference value of a phase difference detected by the sensor device 1. The second channel of the sensor device 1 allows the SAW 70 to propagate through the waveguide 20 including the unreacted antibodies 51 or the reacted antibodies 52 and detects the second phase difference. The second phase difference is determined by the proportion of the reacted antibodies 52 to the antibodies included in the waveguide 20. The sensor device 1 may correct the result of detection of the second phase difference by using the first phase difference as a reference value. The sensor device 1 may calculate the amount of the antigens 61 bound by the antibodies of the waveguide 20-2 of the second channel based on the result of detection of the second phase difference. A calibration curve that specifies the relationship between the amount of change in the second phase difference and the amount of the antigens 61 may be prepared beforehand. The sensor device 1 may covert the amount of change in the second phase difference into the amount, the concentration, the density, or the like of the antigens 61 based on the calibration curve. As a result, the sensor device 1 can detect a detection target included in the specimen 60.

The specimen 60 may include, for example, human blood, urine, saliva, or the like. The specimen 60 is not limited to this, and may include any appropriate chemical substance. The specimen 60 may be preprocessed before the specimen 60 is introduced into a channel of the sensor device 1.

The reaction through which the unreacted antibodies 51 bind to the antigens 61 to become the reacted antibodies 52 progresses with a predetermined reaction velocity. Accordingly, in accordance with the elapsed time after introduction of the specimen 60 into the channel, the proportion of the reacted antibodies 52 to the antibodies included in the waveguide 20 increases, and can gradually approach the proportion of the antigen concentration. As a result, the phase difference that the sensor device 1 detects in the channel changes in accordance with the elapsed time, and can gradually approach a predetermined phase difference. The amount of the reacted antibodies 52 in the antibodies included in the waveguide 20 can saturate when the reaction between the antigens 61 and the unreacted antibodies 51 almost finishes. The sensor device 1 may calculate the amount of the antigens 61 based on the phase difference that is detected after an elapse of a sufficiently long time since the introduction of the specimen 60 into the channel.

The sensor device 1 may detect a period of time from input of an electric signal to the first IDT electrode 11 to detection of the electric signal by the second IDT electrode 12. The sensor device 1 may detect a change in the state of the vicinity of the surface of the waveguide 20 by detecting a change in the propagation velocity by calculating the propagation velocity based on the period of time from input of the electric signal to detection of the electric signal and the distance between the electrodes. Note that the sensor device 1 may detect, as propagation characteristics, a change in the amplitude of the SAW 70 or a plurality of characteristics.

<Configuration of SAW Sensor>

Figure 2:
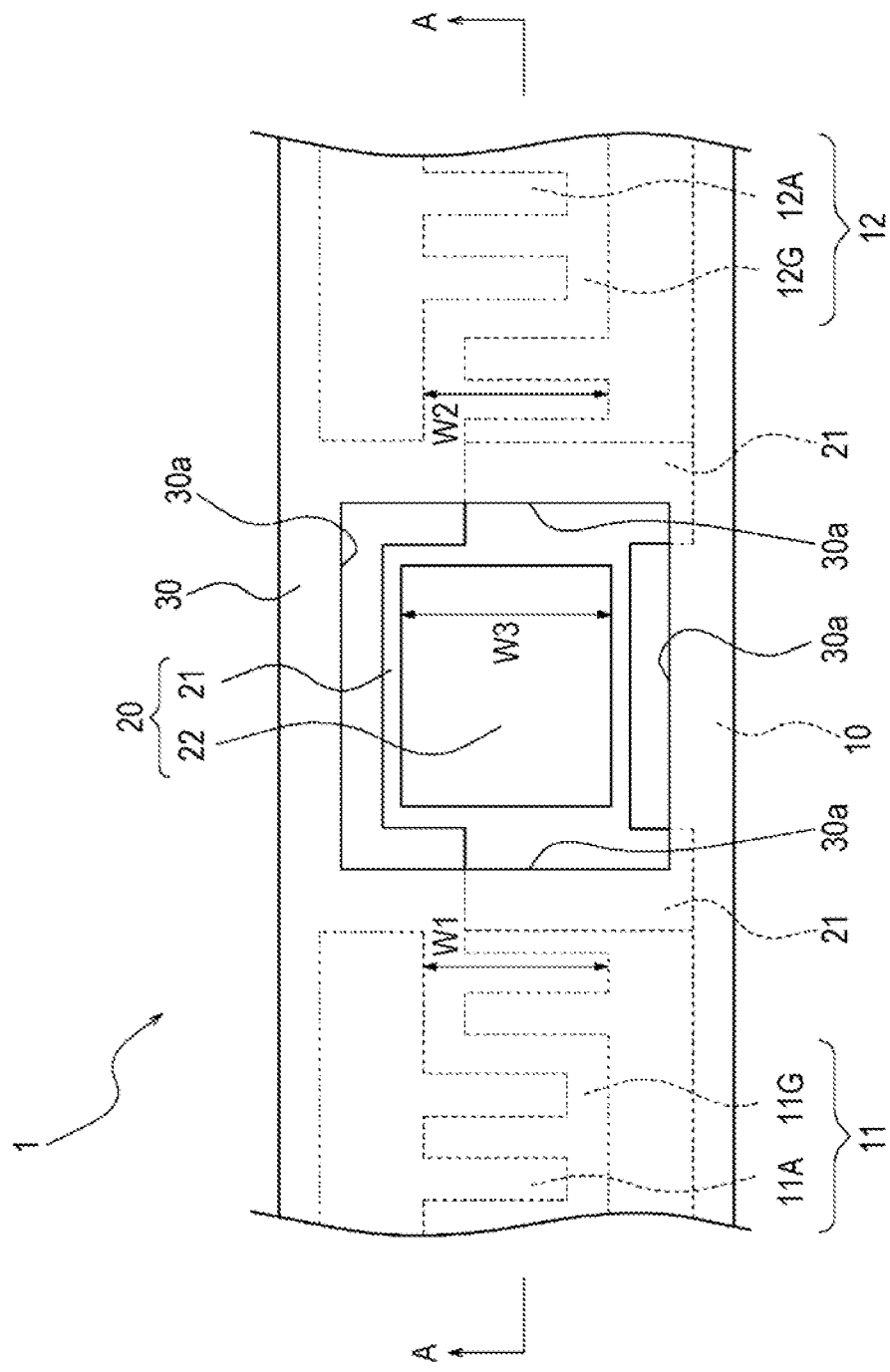
FIG. 2 is a plan view of the sensor device according to the embodiment.
Figure 3:
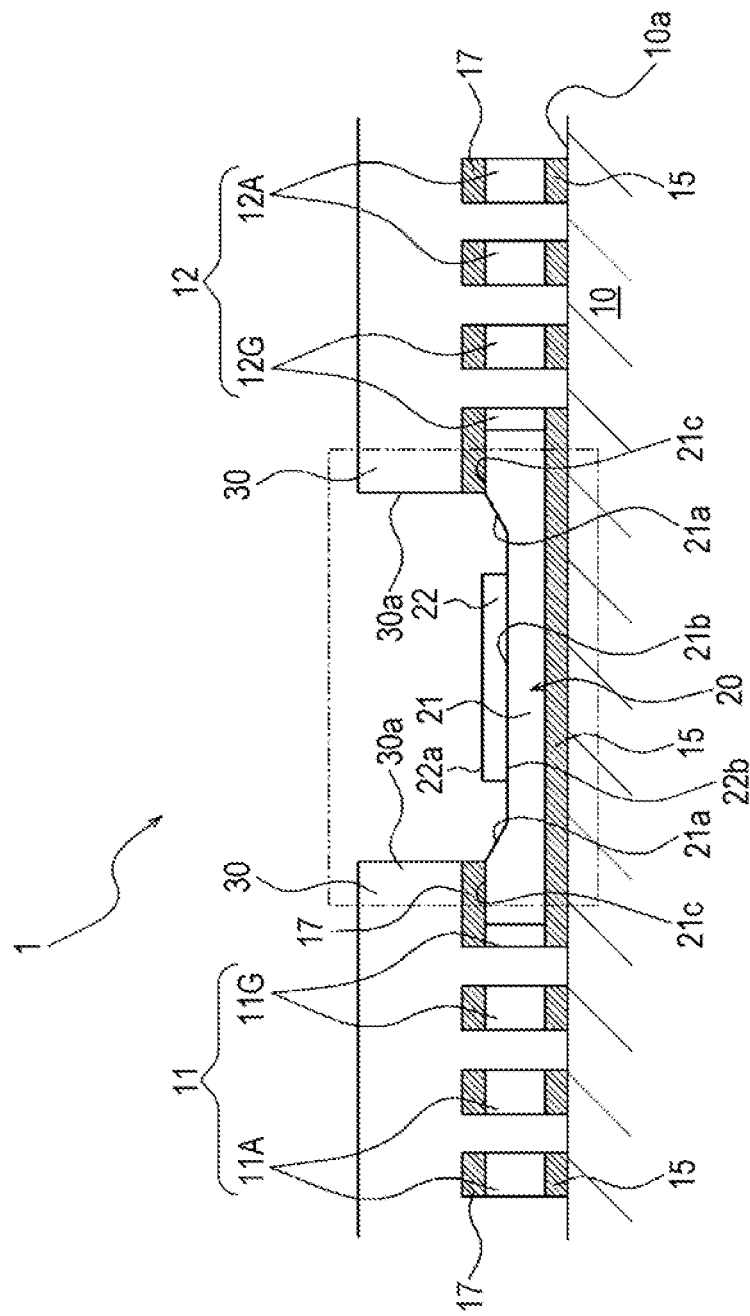
FIG. 3 is a sectional view taken along line A-A of FIG. 2.
Figure 4:
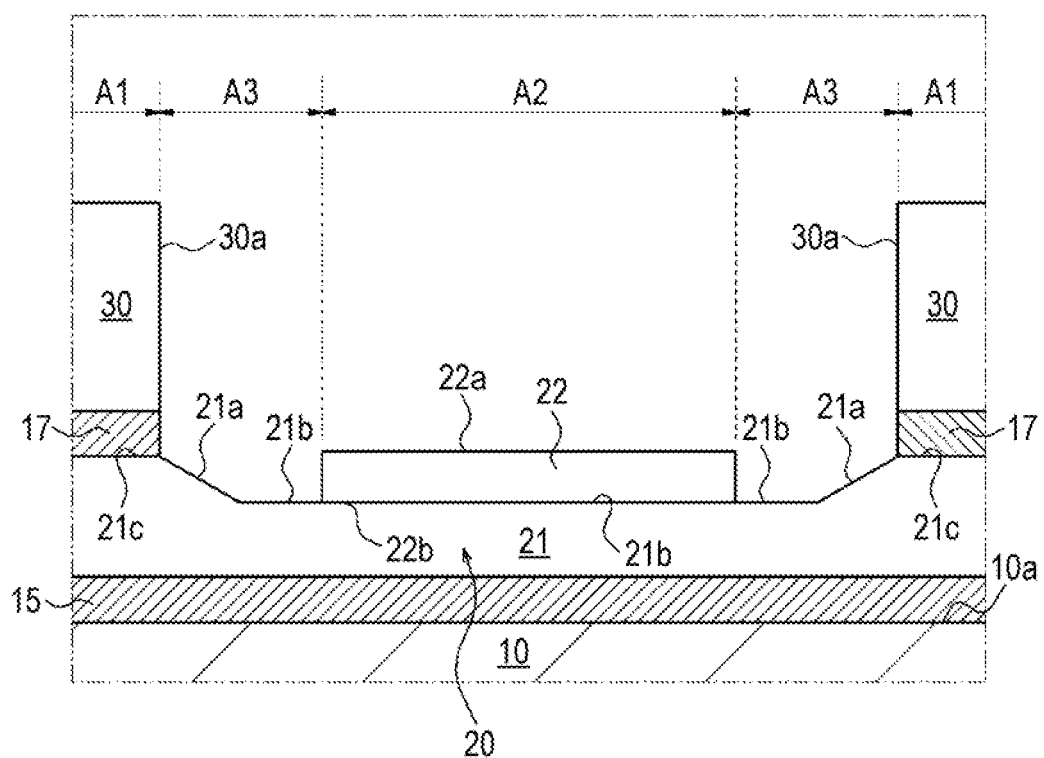
FIG. 4 is an enlarged view of a region surrounded by a two-dot chain line in FIG. 3.

Referring to FIGS. 2, 3, and 4, each element of the sensor device 1 will be described in further detail. As described above, the sensor device 1 includes the substrate 10, the first IDT electrode 11, the second IDT electrode 12, and the waveguide 20. The sensor device 1 further includes a protective film 30.

The substrate 10 has a substrate surface 10a. It is assumed that the substrate 10 is a quartz substrate. However, the substrate 10 is not limited to this, and may be made of another material, such as piezoelectric ceramics, that causes a piezoelectric phenomenon.

The first IDT electrode 11 and the second IDT electrode 12 are positioned on the substrate surface 10a. The first IDT electrode 11 and the second IDT electrode 12 may be made of a metal such as gold (Au) or aluminum (Al). The first IDT electrode 11 and the second IDT electrode 12 may be made of, instead of gold (Au) or aluminum (Al), any other appropriate material such as an alloy (AlCu) of aluminum (Al) and copper (Cu).

The first IDT electrode 11 and the second IDT electrode 12 may have a substrate-side close-contact layer 15 between the first IDT electrode 11 and the second IDT electrode 12 and the substrate surface 10a. The first IDT electrode 11 and the second IDT electrode 12 may have a protective-film-side close-contact layer 17 between the protective film 30 and surfaces thereof on a side opposite to a side facing the substrate surface 10a. The substrate-side close-contact layer 15 and the protective-film-side close-contact layer 17 may be made of, for example, titanium (Ti), chrome (Cr), or the like, but may be made of, instead of these, any other appropriate material. The substrate-side close-contact layer 15 and the protective-film-side close-contact layer 17 may be made of different materials.

The first IDT electrode 11 includes a first reference electrode 11G and a first signal electrode 11A to which a voltage is to be applied. The sensor device 1 generates the SAW 70 in the first IDT electrode 11 by applying a voltage signal between the first reference electrode 11G and the first signal electrode 11A. The first reference electrode 11G may be connected to a ground point. The SAW 70 is generated between the first reference electrode 11G and the first signal electrode 11A. The distance between the first reference electrode 11G and the first signal electrode 11A is denoted by W1. Within the range of a length denoted by W1, the SAW 70 has energy higher than that in the other ranges.

The second IDT electrode 12 includes a second reference electrode 12G and a second signal electrode 12A to which a voltage is to be applied. The sensor device 1 detects an electric signal generated by the propagated SAW 70 by using the second reference electrode 12G and the second signal electrode 12A. The second reference electrode 12G may be connected to a ground point. The SAW 70 propagates between the second reference electrode 12G and the second signal electrode 12A. The distance between the second reference electrode 12G and the second signal electrode 12A is denoted by W2. The SAW 70 propagated to the range of a length denoted by W2 generates in the second IDT electrode 12 an electric signal that is greater than that generated by the SAW 70 propagated to the other ranges. That is, the second IDT electrode 12 can efficiently detect the SAW 70 in the range denoted by W2.

The waveguide 20 is positioned on the substrate surface 10a and between the first IDT electrode 11 and the second IDT electrode 12. The waveguide 20 includes a first immobilized layer 21 and a second immobilized layer 22.

The first immobilized layer 21 is positioned on the substrate surface 10a. It is regarded that the first immobilized layer 21, the first reference electrode 11G, and the second reference electrode 12G are integrally formed, although they are divided in FIGS. 2 and 3 for convenience of description. In the following other figures, it is regarded that the first immobilized layer 21, the first reference electrode 11G, and the second reference electrode 12G are integrally formed, even though they are described below as if being divided. The first immobilized layer 21, the first reference electrode 11G, and the second reference electrode 12G may be treated as independent elements for convenience of description, although they are not divided in the description thereof. When the first immobilized layer 21 is integrally formed with the first reference electrode 11G and the second reference electrode 12G, the first immobilized layer 21 is made of a material that is the same as the material of the first reference electrode 11G and the second reference electrode 12G. The first immobilized layer 21 may be made of, for example, gold (Au). The waveguide 20 comes into contact with the specimen 60. The first immobilized layer 21 may be made of, instead of gold (Au), another material that has oxidation resistance and corrosion resistance against contact with the specimen 60. When the first immobilized layer 21 is integrally formed with the first reference electrode 11G and the second reference electrode 12G, the electric potential of the waveguide 20 is the same as the electric potential of the first reference electrode 11G and the second reference electrode 12G.

The first immobilized layer 21 may be formed as an independent member separate from the first reference electrode 11G and the second reference electrode 12G by a predetermined distance. When the first immobilized layer 21 is formed an independent member separate from the first reference electrode 11G and the second reference electrode 12G, the first immobilized layer 21 may be made of a material that is the same as or different from the material of the first reference electrode 11G and the second reference electrode 12G. The first immobilized layer 21 may be made of, for example, gold (Au) or another material that has oxidation resistance and corrosion resistance against contact with the specimen 60. When the first immobilized layer 21 is integrally formed with the first reference electrode 11G and the second reference electrode 12G, the electric potential of the waveguide 20 may be the same as the electric potential of at least one of the first reference electrode 11G and the second reference electrode 12G. The electric potential of the waveguide 20 may be a floating potential.

The first immobilized layer 21 may have the substrate-side close-contact layer 15 between the first immobilized layer 21 and the substrate surface 10a. The substrate-side close-contact layer 15 of the first immobilized layer 21 may be formed integrally with or separate from the substrate-side close-contact layer 15 of the first IDT electrode 11 and the second IDT electrode 12.

The first immobilized layer 21 has an upper surface on a side opposite to a side facing the substrate surface 10a. The upper surface of the first immobilized layer 21 may include a tapering surface 21a, a recessed surface 21b, and a covered surface 21c. The first immobilized layer 21 may have the protective-film-side close-contact layer 17 between the covered surface 21c and the protective film 30. The height of the recessed surface 21b as seen from the substrate surface 10a is less than or equal to the height of the covered surface 21c. The tapering surface 21a is positioned between the recessed surface 21b and the covered surface 21c and is inclined at a predetermined angle with respect to the substrate surface 10a.

The second immobilized layer 22 has an upper surface 22a, and is positioned on the upper surface of the first immobilized layer 21. In a plan view of the substrate 10, the second immobilized layer 22 may be positioned inside an outer edge of the upper surface of the first immobilized layer 21. The second immobilized layer 22 may have a contact surface 22b on a side facing the substrate surface 10a. The contact surface 22b may be in direct contact with a part of the upper surface of the first immobilized layer 21. When a third immobilized layer 23 is positioned between the first immobilized layer 21 and the second immobilized layer 22 as described below, the contact surface 22b may be in contact with a part of the upper surface of the first immobilized layer 21 via the third immobilized layer 23. In other words, the contact surface 22b may face a part of the upper surface of the first immobilized layer 21 via the third immobilized layer 23, while being in contact with the third immobilized layer 23. In a plan view of the substrate 10, the contact surface 22b may be positioned inside the outer edge of the upper surface of the first immobilized layer 21. The second immobilized layer 22 may be positioned in the range of the recessed surface 21b. That is, the second immobilized layer 22 may be positioned not to overlap the tapering surface 21a. A part of the second immobilized layer 22 may be positioned on the tapering surface 21a. The second immobilized layer 22 may be positioned to cover a half or more of the upper surface of the first immobilized layer 21. As described below, the waveguide 20 may include the third immobilized layer 23 (see FIG. 13) between the first immobilized layer 21 and the second immobilized layer 22. When the waveguide 20 does not include the third immobilized layer 23, the first immobilized layer 21 and the second immobilized layer 22 can be discriminated from each other by using any appropriate analysis method. As the analysis method, for example, a scanning electron microscope (SEM), a transmission electron microscope (TEM), or the like may be used, or another method may be used.

The second immobilized layer 22 may be made of, for example, gold (Au). The second immobilized layer 22 may be made of, instead of gold (Au), another material that has oxidation resistance and corrosion resistance against contact with the specimen 60. The second immobilized layer 22 may be made of a material that is the same as the material of the first immobilized layer 21 or a material that is different from the material of the first immobilized layer 21. The surface roughness of the upper surface 22a of the second immobilized layer 22 may be different from the surface roughness of the upper surface of the first immobilized layer 21. The surface roughness of the upper surface 22a of the second immobilized layer 22 may be less than the surface roughness of the upper surface of the first immobilized layer 21. The thickness of the second immobilized layer 22 may be different from the thickness of the first immobilized layer 21. The thickness of the second immobilized layer 22 may be less than the thickness of the first immobilized layer 21.

The protective film 30 covers the substrate surface 10a, the first IDT electrode 11, the second IDT electrode 12, and the covered surface 21c of the first immobilized layer 21. The protective film 30 covers the covered surfaces 21c that are respectively positioned adjacent to the first IDT electrode 11 and the second IDT electrode 12. That is, the protective film 30 covers end portions of the waveguide 20 that are respectively adjacent to the first IDT electrode 11 and the second IDT electrode 12.

The protective film 30 may be a TEOS oxide film. The TEOS oxide film is a silicon oxide film formed by using a plasma chemical vapor deposition (CVD) method in which tetraethoxysilane is used as a material gas. The protective film 30 is not limited to the TEOS oxide film, and may be made of another insulating material. The protective film 30 includes a side wall 30a that intersects the substrate surface 10a. The side wall 30a defines an opening of the protective film 30. The tapering surface 21a and the recessed surface 21b of the first immobilized layer 21 and the second immobilized layer 22 are positioned in the opening of the protective film 30. That is, the protective film 30 does not cover the tapering surface 21a and the recessed surface 21b of the first immobilized layer 21 and the upper surface 22a of the second immobilized layer 22.

The sensor device 1 includes the unreacted antibodies 51 on the upper surface 22a of the second immobilized layer 22 in order to detect the antigens 61. The sensor device 1 may include, on the upper surface 22a of the second immobilized layer 22, another element, such as aptamers or enzymes, that can react with a detection target substance or can bind to the detection target substance.

It is required that the sensor device 1 detect a change in the state of the vicinity of the upper surface 22a of the second immobilized layer 22 with high accuracy. The SAW 70 propagates in a region including the vicinity of the upper surface 22a of the second immobilized layer 22. As a larger amount of energy of the SAW 70, which propagates in the second immobilized layer 22, is distributed in the vicinity of the upper surface 22a, the correlation between the propagation characteristics of the SAW 70 and the change in the state of the vicinity of the upper surface 22a of the second immobilized layer 22 becomes stronger.

As illustrated in FIG. 4, the waveguide 20 includes, in the upper surface thereof, the covered surface 21c of the first immobilized layer 21 that is covered by the protective film 30. A region including at least a part of the covered surface 21c of the first immobilized layer 21 is also called a "first region" and denoted by A1. The waveguide 20 includes, in the upper surface thereof, the upper surface 22a of the second immobilized layer 22 that is not covered by the protective film 30. A region including at least a part of the upper surface 22a of the second immobilized layer 22 is also called a "second region" and denoted by A2. The waveguide 20 includes, in the upper surface thereof, the tapering surface 21a of the first immobilized layer 21 and the recessed surface 21b on which the second immobilized layer 22 is not positioned. A region including at least a part of the tapering surface 21a of the first immobilized layer 21 and at least a part of the recessed surface 21b on which the second immobilized layer 22 is not positioned is also called a "third region" and denoted by A3.

The SAW 70 propagates in the vicinity of the upper surface of the waveguide 20. As seen from the substrate surface 10a, the height of the third region is less than the height of the first region.

The propagation characteristics of the SAW 70 in the waveguide 20 are based on the propagation characteristics of the first immobilized layer 21 and the propagation characteristics of the second immobilized layer 22. As the thickness of the first immobilized layer 21 and the second immobilized layer 22 becomes larger, the first immobilized layer 21 and the second immobilized layer 22 exert a greater effect on the propagation characteristics of the SAW 70 in the waveguide 20. That is, the sensitivity of the sensor device 1 can be controlled by controlling the aforementioned thickness. As seen from the substrate surface 10a, the height of the third region is less than the height of the second region.

The energy of the SAW 70 can be concentrated on the vicinity of the surface of the second immobilized layer 22. The size of the second immobilized layer 22 in a direction that intersects the propagation direction of the SAW 70 is denoted by W3 in FIG. 2. W3 has a length greater than or equal to W1 and W2. If W3 is shorter than W1 and W2, in the energy of the SAW 70 that propagates from the first IDT electrode 11 to the second IDT electrode 12, the proportion of the energy of the SAW 70 that propagates outside of the second immobilized layer 22 increases. As the proportion of the energy of the SAW 70 that propagates outside of the second immobilized layer 22 increases, the sensitivity in detection of a change in the state of the vicinity of the surface of the second immobilized layer 22 decreases. When W3 has a length greater than or equal to W1 and W2, the proportion of the energy of the SAW 70 that propagates outside of the second immobilized layer 22 can be reduced. In this case, the sensitivity in detection of a change in the state of the vicinity of the surface of the second immobilized layer 22 can be improved. When W3 has a length greater than or equal to W1 and W2, the SAW 70 can efficiently propagate from the first IDT electrode 11 to the second immobilized layer 22.

The first reference electrode 11G and the first signal electrode 11A of the first IDT electrode 11 are each comb-shaped in a plan view. In the sensor device 1 illustrated in FIG. 2, the first reference electrode 11G and the first signal electrode 11A each include two comb teeth. However, the electrodes 11G and 11A each may include one comb tooth or three or more comb teeth. The first reference electrode 11G and the first signal electrode 11A are alternately arranged in a direction from the waveguide 20 toward the first IDT electrode 11. Pairs each composed of one first reference electrode 11G and one first signal electrode 11A are arranged at a first pitch. As described above, the first IDT electrode 11 generates the SAW 70 along the surface of the substrate 10 based on an electric signal that is input to the first reference electrode 11G and the first signal electrode 11A. The wavelength of the SAW 70 generated by the first IDT electrode 11 corresponds to the first pitch.

The second reference electrode 12G and the second signal electrode 12A of the second IDT electrode 12 are each comb-shaped in a plan view. In the sensor device 1 illustrated in FIG. 2, the second reference electrode 12G and the second signal electrode 12A each include two comb teeth. However, the electrodes 12G and 12A each may include one comb tooth or three or more comb teeth. The second reference electrode 12G and the second signal electrode 12A are alternately arranged in a direction from the waveguide 20 toward the second IDT electrode 12. Pairs each composed of one second reference electrode 12G and one second signal electrode 12A are arranged at a second pitch. As described above, the second IDT electrode 12 outputs, to the second reference electrode 12G and the second signal electrode 12A, an electric signal based on the SAW 70 propagated from the first IDT electrode 11 through the waveguide 20. As the wavelength of the SAW 70 becomes closer to the second pitch, the efficiency with which the SAW 70 is converted into an electric signal by the second IDT electrode 12 increases. In other words, as the difference between the first pitch and the second pitch becomes smaller, the efficiency with which the SAW 70 is converted into an electric signal by the second IDT electrode 12 increases. In the present embodiment, the sensor device 1 is configured in such a way that the first pitch and the second pitch coincide.

<Method of Manufacturing SAW Sensor>

Referring to FIGS. 2 to 10, a method of manufacturing the sensor device 1 will be described.

Figure 5:
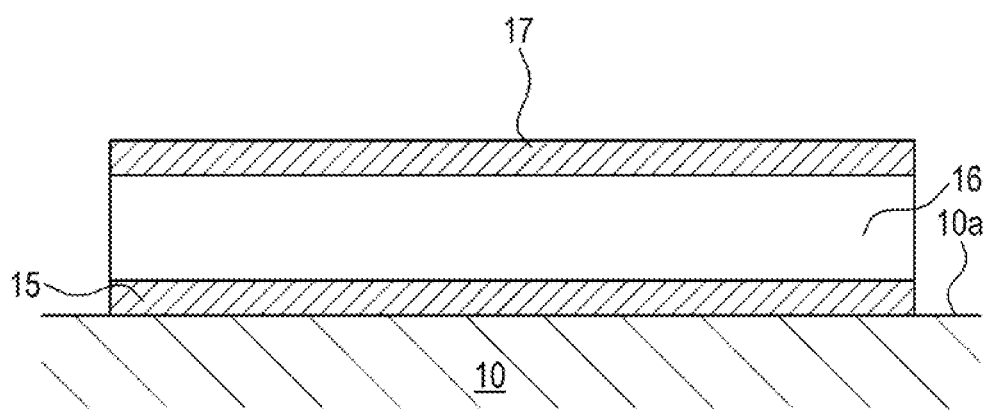
FIG. 5 is a sectional view of a substrate on which a first step of a method of manufacturing a sensor device has been performed.

In a first step, the substrate-side close-contact layer 15, a metal layer 16, and the protective-film-side close-contact layer 17 are formed on the substrate surface 10a of the substrate 10. As a result of performing the first step, the substrate 10 is configured as illustrated in FIG. 5. It is assumed that the substrate-side close-contact layer 15 and the protective-film-side close-contact layer 17 are made of titanium (Ti). It is assumed that the metal layer 16 is made of gold (Au).

Figure 6:
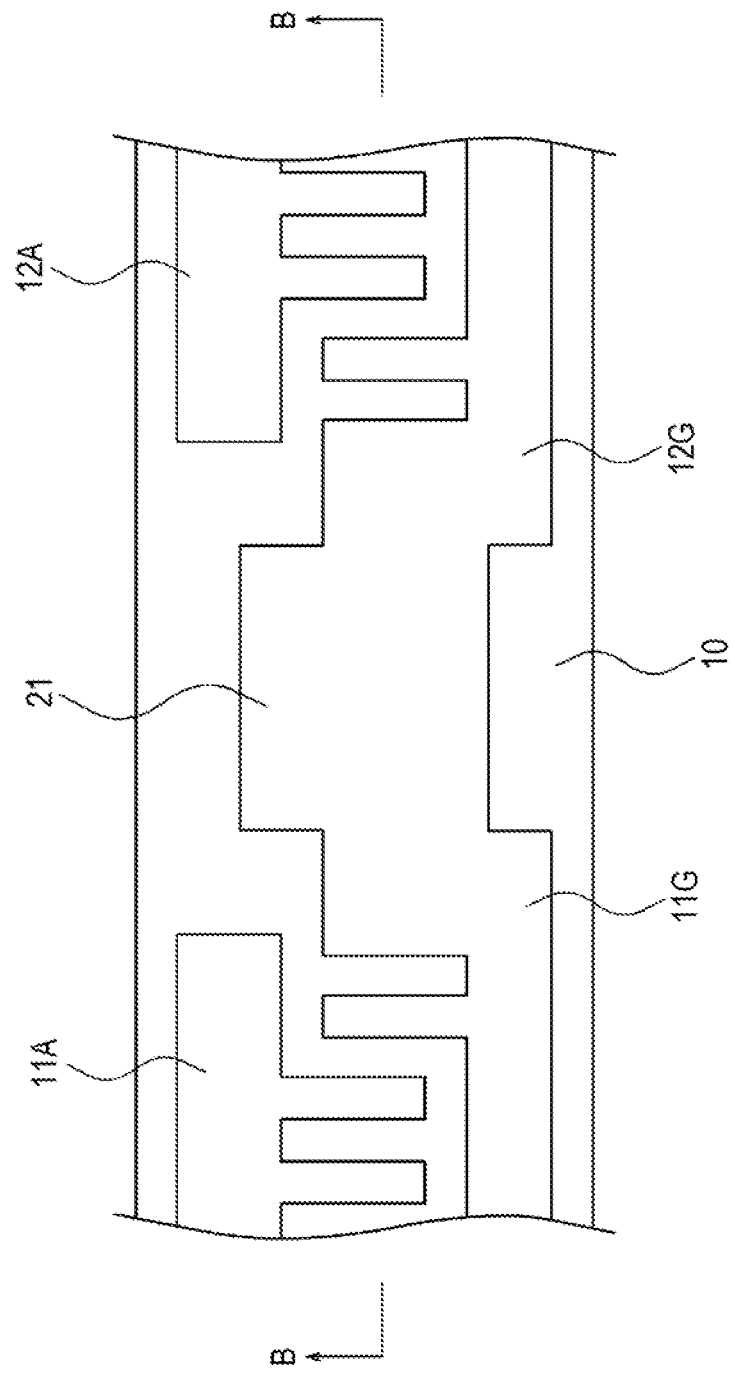
FIG. 6 is a plan view of the substrate on which a second step of the method of manufacturing a sensor device has been performed.
Figure 7:
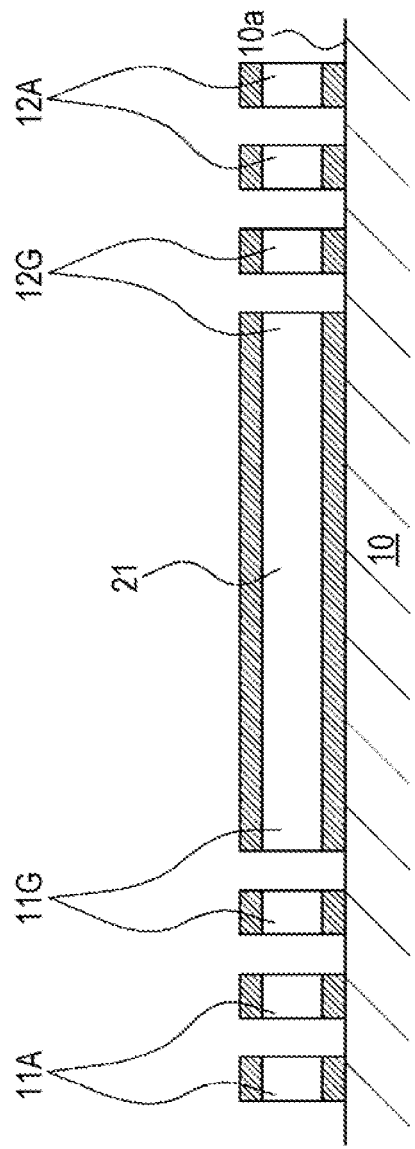
FIG. 7 is a sectional view taken along line B-B in FIG. 6.

In a second step, the first reference electrode 11G and the first signal electrode 11A, the second reference electrode 12G and the second signal electrode 12A, and the first immobilized layer 21 that constitutes the waveguide 20 are formed. The first reference electrode 11G and the first signal electrode 11A constitute the first IDT electrode 11. The second reference electrode 12G and the second signal electrode 12A constitute the second IDT electrode 12. As a result of performing the second step, the substrate 10 is configured as illustrated in FIGS. 6 and 7.

The first reference electrode 11G, the first signal electrode 11A, the second reference electrode 12G, the second signal electrode 12A, and the first immobilized layer 21 may be formed by using any appropriate processing technology. For example, etching based on a mask having a desirable pattern may be used. The mask may be formed, for example, by photolithography. As the mask, a resist resin or the like may be used. The etching may include wet etching or dry etching. The wet etching may include a step of dissolving a material in an acid solution, an alkaline solution, or the like. The dry etching may include a step of removing a material by using plasma, such as reactive ion etching (RIE) or sputter etching.

The first step and the second step may be replaced with a step of forming the first IDT electrode 11, the second IDT electrode 12, and the first immobilized layer 21 in a patterned state on the substrate surface 10*a*. The step of forming these in a patterned state can be realized, for example, by forming the substrate-side close-contact layer 15, the metal layer 16, and the protective-film-side close-contact layer 17 in a state of being covered by a hard mask made of a metal, a resist resin mask, or the like.

In the first step and the second step, the first IDT electrode 11, the second IDT electrode 12, and the first immobilized layer 21 are simultaneously formed. A step of forming the first IDT electrode 11 and the second IDT electrode 12 and a step of forming the first immobilized layer 21 may be divided as independent steps. When the steps are divided, whichever of the steps may be performed first. When the first IDT electrode 11, the second IDT electrode 12, and the first immobilized layer 21 are simultaneously formed, the position of the first immobilized layer 21 relative to the first IDT electrode 11 and the second IDT electrode 12 can be controlled with high accuracy. When the SAW 70 is caused to propagate from the first IDT electrode 11 to the second IDT electrode 12 via the waveguide 20, the distance from the first IDT electrode 11 and the second IDT electrode 12 to the first immobilized layer 21 is important. With the present step, because the position of the first immobilized layer 21 relative to the first IDT electrode 11 and the second IDT electrode 12 is controlled with high accuracy, it is possible to improve the accuracy of the distance and to improve the measurement accuracy.

Figure 8:
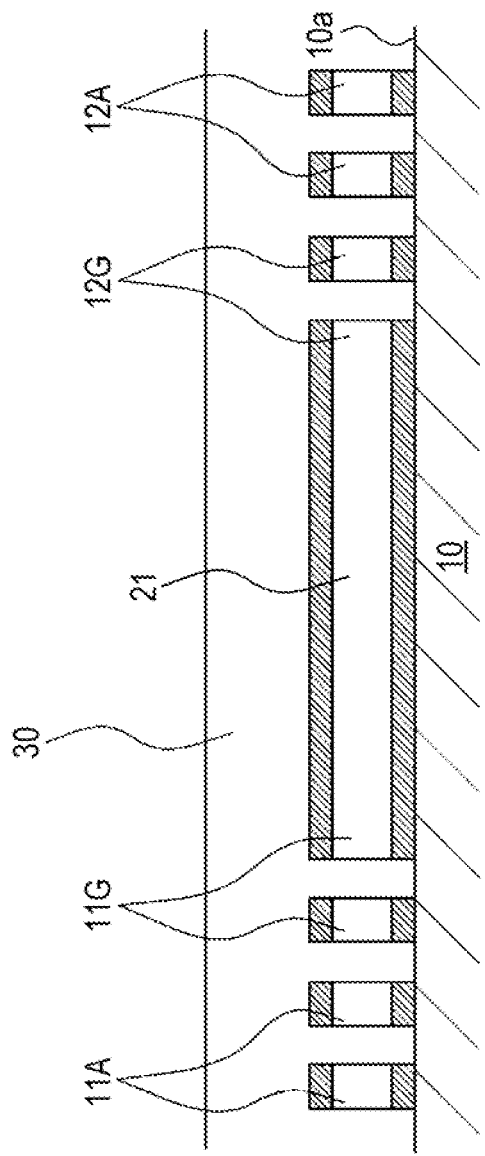
FIG. 8 is a sectional view of the substrate on which a third step of the method of manufacturing a sensor device has been performed.

In a third step, the protective film 30 for covering elements formed on the substrate surface 10*a* is formed. As a result of performing the third step, the substrate 10 is configured as illustrated in FIG. 8. It is assumed that the protective film 30 is a TEOS oxide film.

Figure 9:
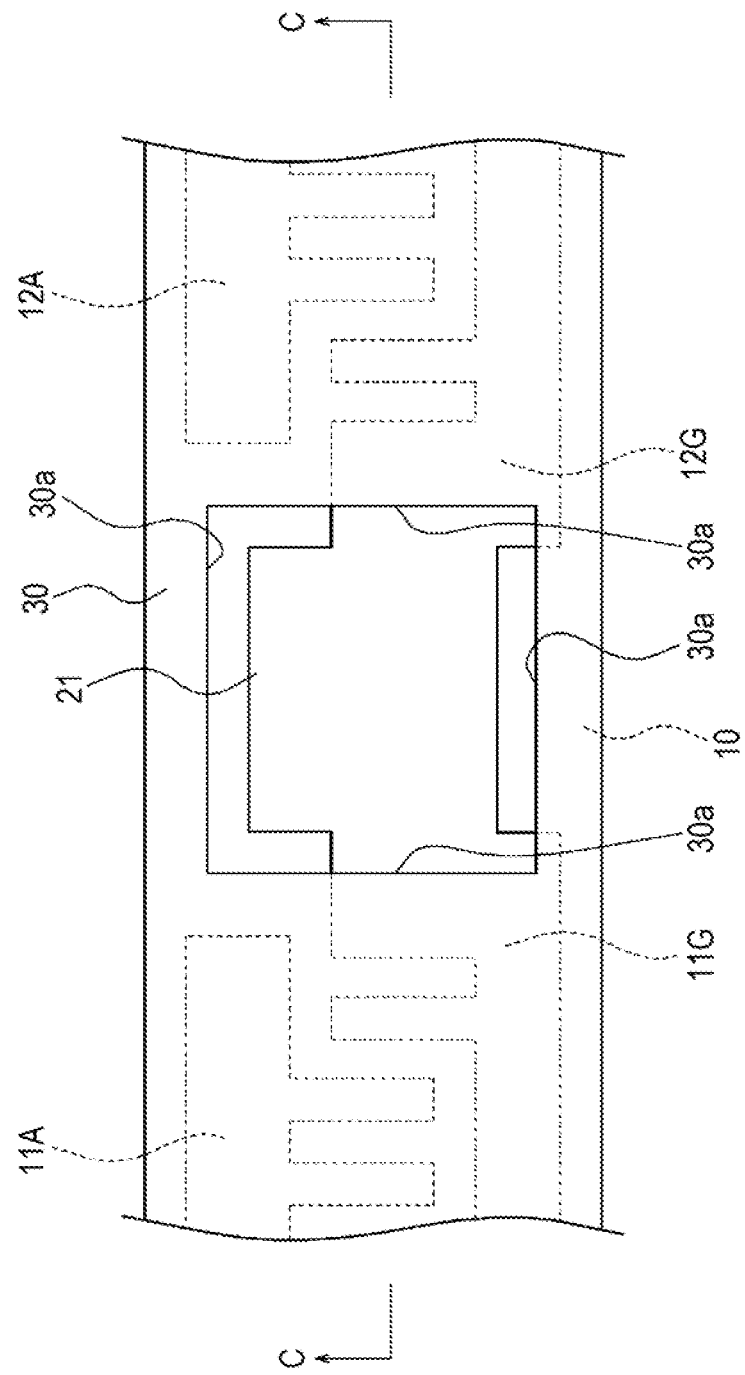
FIG. 9 is a plan view of the substrate on which a fourth step of the method of manufacturing a sensor device has been performed.
Figure 10:
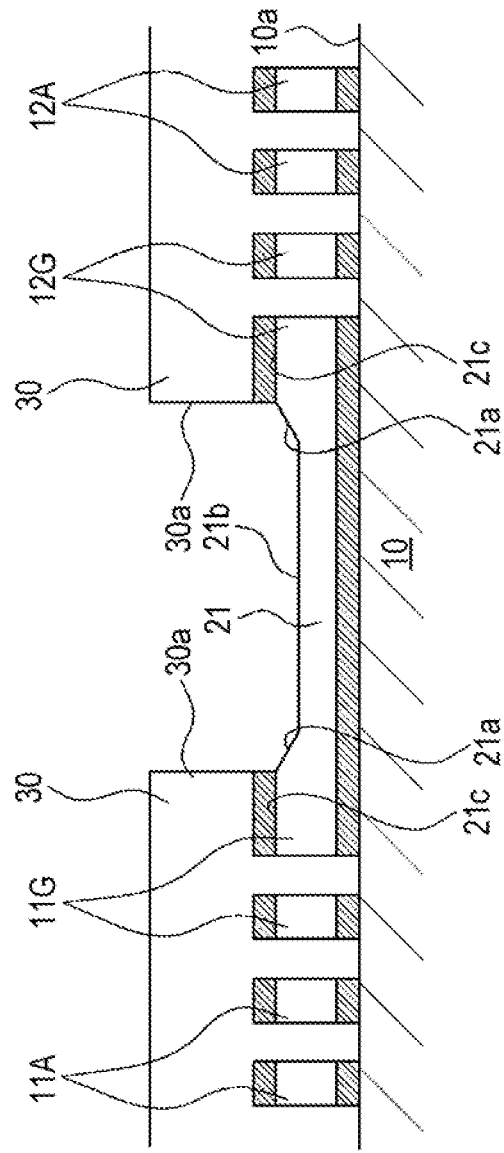
FIG. 10 is a sectional view taken along line C-C in FIG. 9.

In a fourth step, a part of the protective film 30 is removed. As a result of performing the fourth step, the substrate 10 is configured as illustrated in FIGS. 9 and 10. The protective film 30 is removed to expose at least a part of the first immobilized layer 21 while leaving the first IDT electrode 11 and the second IDT electrode 12 to be covered. Because a part of the protective film 30 is removed, an opening surrounded by the side wall 30*a* is formed in the protective film 30. It can be said that the first immobilized layer 21 is exposed in the opening. The protective film 30 may be removed, for example, by etching based on a mask having a pattern of the opening. The etching may be performed by using any appropriate method.

It is assumed that the opening in the protective film 30 is formed by etching such as dry etching or wet etching. In the present embodiment, it is assumed that the opening is formed by, for example, dry etching including sputtering, such as RIE. Sputtering can form the tapering surface 21*a* and the recessed surface 21*b* of the first immobilized layer 21, while forming the opening of the protective film 30. The tapering surface 21*a* and the recessed surface 21*b* of the first immobilized layer 21 are called an "exposed surface" of the first immobilized layer 21.

In a fifth step, the second immobilized layer 22 is formed. As a result of performing the fifth step, the substrate 10 is configured as illustrated in FIGS. 2 and 3. The second immobilized layer 22 may be formed in a desirable pattern by, for example, being formed in a state of being covered by a hard mask. In a case where the second immobilized layer 22 is patterned in the state of being covered by a mask, it becomes easier to maintain the state of the second immobilized layer 22 after being patterned to be the same as the state immediately after being formed, compared with a case where the immobilized layer is patterned by etching. That is, patterning performed by forming a layer in a masked state is less likely to exert an effect on the second immobilized layer 22 than patterning performing by etching. That is, the surface of the second immobilized layer 22 is regulated further than the surface of the first immobilized layer 21, and it is easier to immobilize antibodies on the surface of the second immobilized layer 22 than on the surface of the first immobilized layer 21.

As the thickness of the second immobilized layer 22 increases, the thickness of the waveguide 20, including the first immobilized layer 21 and the second immobilized layer 22, increases. The thickness of the waveguide 20 exerts an effect on the sensitivity of the sensor device 1. By forming the second immobilized layer 22 in a step different from a step of forming the first immobilized layer 21, it becomes easier to control the thickness of the waveguide 20. As a result, it becomes easier to control the sensitivity of the sensor device 1.

In a sixth step, a substance, such as antibodies, aptamers, or enzymes, that reacts with a detection target is immobilized on the upper surface 22*a* of the second immobilized layer 22. In the present embodiment, it is assumed that the unreacted antibodies 51 (see FIG. 1) are immobilized on the upper surface 22*a* of the second immobilized layer 22. That is, the unreacted antibodies 51 are immobilized on the upper surface of the waveguide 20. When the second immobilized layer 22 is made of gold (Au), the antibodies may be formed, for example, on the surface of the second immobilized layer 22 based on a gold thiol bond, which is a bond between gold (Au) and divalent sulfur (S). In this case, a polymer film is formed on the surface of the second immobilized layer 22, and antibodies may be bound to the polymer by amine coupling by using an appropriate condensation agent (such as EDC/NHS reagent) in the polymer film. The antibodies may be immobilized on the second immobilized layer 22 by being bound to the polymer film. The state of the upper surface 22*a* of the second immobilized layer 22 can exert an effect on immobilization of the antibodies. For example, a surface state such as the composition and the surface roughness of the upper surface 22*a* can exert an effect as to whether or not the antibodies can be easily immobilized on the upper surface 22*a*.

The state of the second immobilized layer 22 can exert an effect on immobilization of the antibodies to the upper surface. In order to control the sensitivity of the sensor device 1 with high accuracy, it is required to control the state of the second immobilized layer 22 on which the unreacted antibodies 51 are to be immobilized.

If the second immobilized layer 22 is not formed, the unreacted antibodies 51 are immobilized on the recessed surface 21*b* of the first immobilized layer 21. The state of the recessed surface 21*b* is changed due to etching of the protective film 30. Etching includes many uncertain factors. Accordingly, it is difficult to control the change in the state of a surface due to etching. For example, the surface roughness of the recessed surface 21*b* changes due to etching. However, it is difficult to control the surface roughness.

On the other hand, in the present embodiment, the second immobilized layer 22 is formed. The state of the upper surface 22*a* of the second immobilized layer 22 can be controlled more easily than the state of the recessed surface 21*b* of the first immobilized layer 21. For example, the surface roughness of the upper surface 22*a* can be controlled by controlling the film-forming conditions of the second immobilized layer 22. In general, it is easier to control the surface roughness by film-forming than to control the surface roughness by etching. Accordingly, it becomes easier to immobilize the unreacted antibodies 51 on the upper surface 22a of the second immobilized layer 22. As a result, it becomes easier to control the sensitivity of the sensor device 1.

The sensor device 1 according to the present embodiment may be manufactured by performing each of the aforementioned steps. The aforementioned steps are each an example. Any appropriate step may be added. Some of the steps may be omitted.

Figure 11:
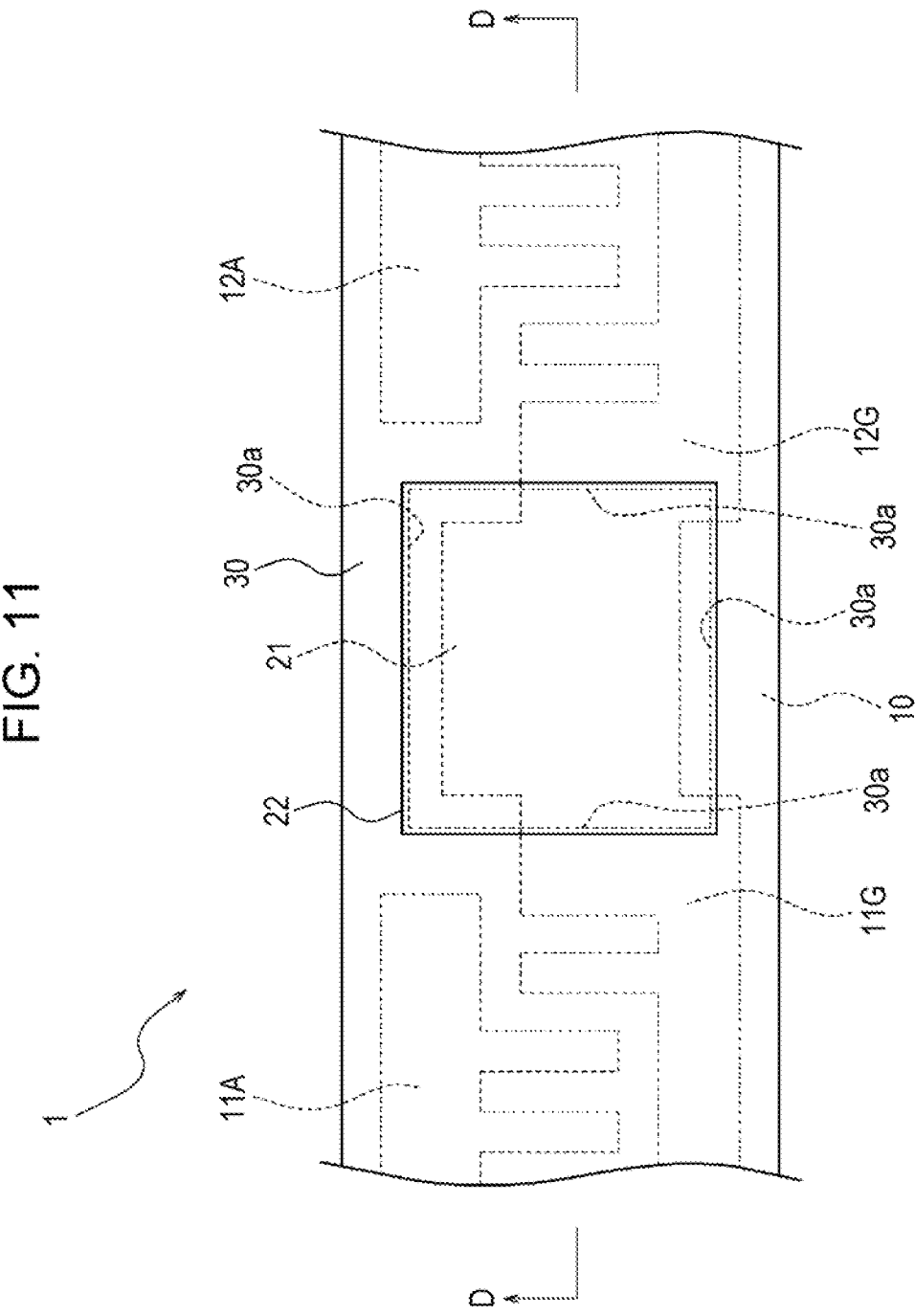
FIG. 11 is a sectional view illustrating an example of a configuration in which a second immobilized layer is positioned also on the upper side of a protective film.
Figure 12:
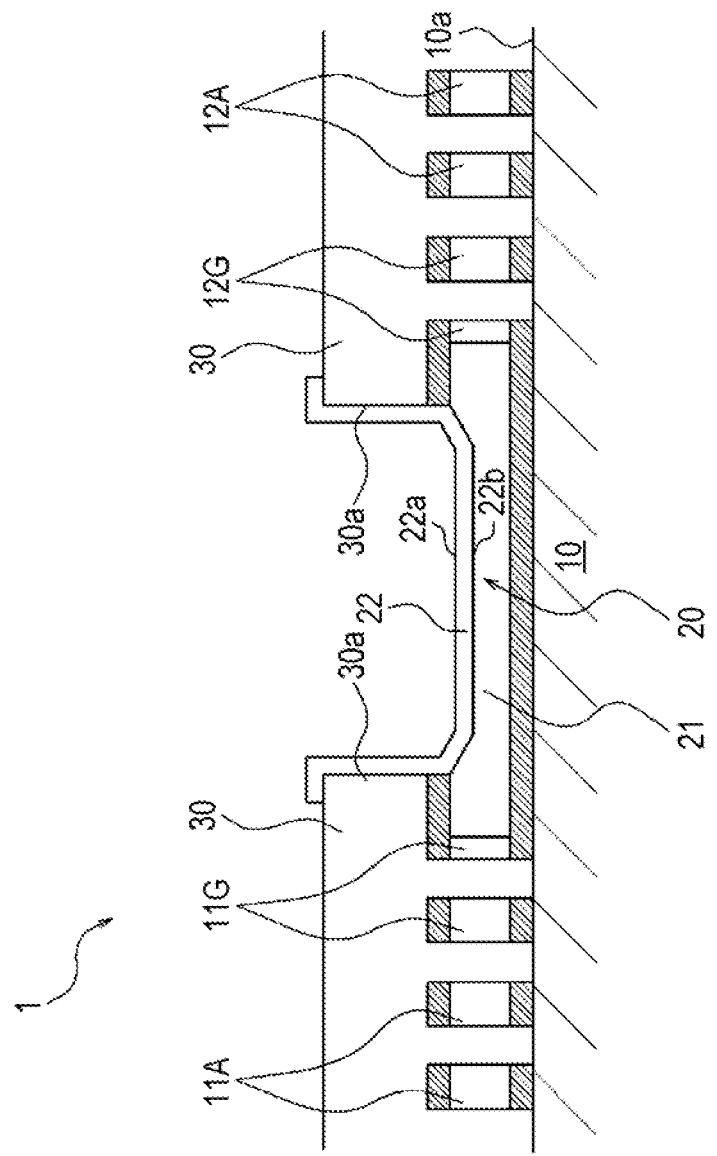
FIG. 12 is a sectional view taken along line D-D in FIG. 11.

As illustrated in FIGS. 11 and 12, the second immobilized layer 22 may be positioned on the side wall 30a of the protective film 30. The second immobilized layer 22 may be positioned further outside as seen from the opening formed in the side wall 30a. That is, end portions of the second immobilized layer 22 that are respectively adjacent to the first IDT electrode 11 and the second IDT electrode 12 are positioned on the upper side of the protective film 30.

The protective film 30 covers the covered surfaces 21c that are positioned respectively adjacent to the first IDT electrode 11 and the second IDT electrode 12. That is, the protective film 30 covers end portions of the first immobilized layer 21 that are respectively adjacent to the first IDT electrode 11 and the second IDT electrode 12.

Figure 13:
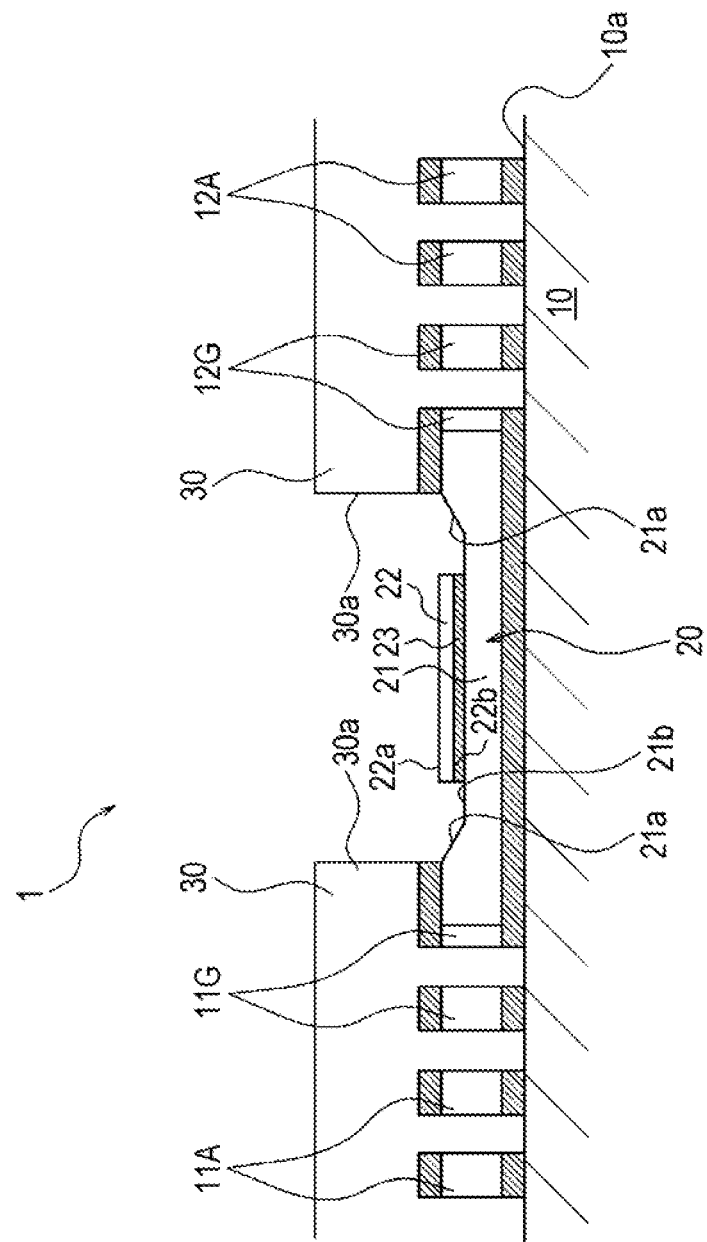
FIG. 13 is a sectional view illustrating an example of a configuration in which a waveguide includes a third immobilized layer.

As illustrated in FIG. 13, the waveguide 20 may further include the third immobilized layer 23 between the recessed surface 21b of the first immobilized layer 21 and the second immobilized layer 22. The third immobilized layer 23 can improve the closeness of contact between the second immobilized layer 22 and the first immobilized layer 21. The third immobilized layer 23 may be made of, for example, titanium (Ti), chrome (Cr), or the like. The material of the third immobilized layer 23 is not limited to these, and may be a material having high closeness of contact between the first immobilized layer 21 and the second immobilized layer 22. When the closeness of contact between the first immobilized layer 21 and the second immobilized layer 22 increases, the reliability of the sensor device 1 can be improved.

Figure 14:
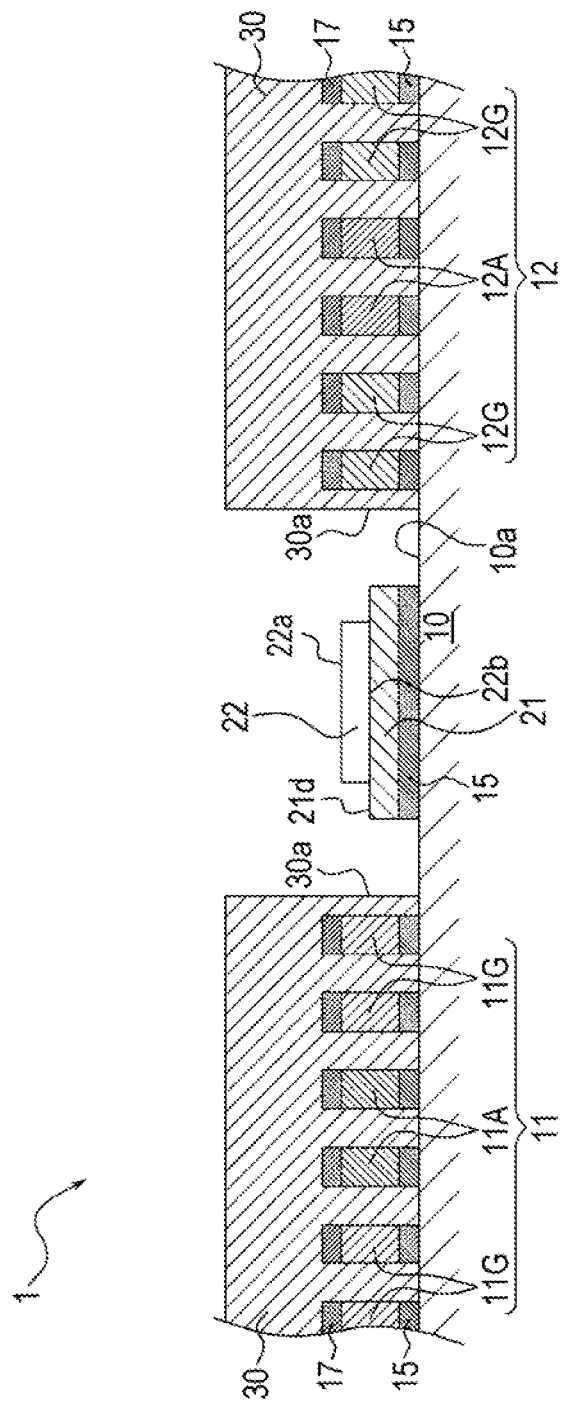
FIG. 14 is a sectional view illustrating an example of a configuration in which a first IDT electrode, a second IDT electrode, and a waveguide are separated from each other.

As illustrated in FIG. 14, when the first IDT electrode 11 and the second IDT electrode 12 and the waveguide 20 are formed as independent members, the protective film 30 need not cover the waveguide 20, although the protective film 30 covers the first IDT electrode 11 and the second IDT electrode 12. That is, the side wall 30a of the protective film 30 may be positioned between the first IDT electrode 11 and the second IDT electrode 12 and the waveguide 20. The waveguide 20 includes the first immobilized layer 21 and the second immobilized layer 22. The first immobilized layer 21 has an upper surface 21d. The second immobilized layer 22 has the upper surface 22a, and is positioned on the upper surface 21d of the first immobilized layer 21. The second immobilized layer 22 has the contact surface 22b on a side facing the substrate surface 10a. The contact surface 22b is in contact with a part of the upper surface 21d of the first immobilized layer 21. The second immobilized layer 22 may be positioned to cover a half or more of the upper surface 21d of the first immobilized layer 21. The waveguide 20 may include the third immobilized layer 23 (see FIG. 13) between the first immobilized layer 21 and the second immobilized layer 22. In these cases, the second immobilized layer 22 can be formed in a step different from a step of forming the first immobilized layer 21. By forming the second immobilized layer 22 in a step different from a step of forming the first immobilized layer 21, it becomes easier to control the thickness of the waveguide 20. As a result, it becomes easier to control the sensitivity of the sensor device 1.

The figures illustrating embodiments according to the present disclosure are schematic.

Heretofore, embodiments of the present disclosure have been described based on the drawings and examples. Note that a person having ordinary skill in the art can easily perform various modifications and corrections based on the present disclosure. Accordingly, note that these modifications and corrections are included in the scope of the present disclosure. For example, it is possible to rearrange functions and the like included in each element without allowing logical contradiction, and it is possible to unite or divide a plurality of elements and the like.

In the present embodiment, ordinal numbers such as "first" and "second" are identifiers for discriminating between the elements. In the present disclosure, regarding the elements that are discriminated by the ordinal numbers such as "first" and "second", the ordinal numbers may be replaced with each other. For example, the identifiers "first" and "second" of the first phosphor and the second phosphor may be replaced with each other. Replacement of the identifiers is performed simultaneously. Even after the replacement of identifiers, the elements are discriminated. The identifiers may be omitted. Elements from which the identifiers are omitted are discriminated by reference numerals. In the present disclosure, the identifiers "first", "second", and the like should not be used for the interpretation of the order of the elements and as the basis for the presence of an identifier with a smaller number.

The invention claimed is:

1. A sensor device comprising:
a substrate having a substrate surface;
a first interdigital transducer (IDT) electrode positioned on the substrate surface;
a second IDT electrode positioned on the substrate surface; and
a waveguide positioned on the substrate surface and between the first IDT electrode and the second IDT electrode,
wherein the waveguide includes a first immobilized layer positioned on the substrate surface and a second immobilized layer positioned on the first immobilized layer, wherein the first immobilized layer has a recessed surface, and
wherein the second immobilized layer is positioned on the recessed surface and inside an outer edge of the first immobilized layer as seen in a plan view.

2. The sensor device according to claim 1, further comprising a protective film that covers the first IDT electrode, the second IDT electrode, and end portions of the waveguide that are respectively adjacent to the first IDT electrode and the second IDT electrode.

3. The sensor device according to claim 2,
wherein the waveguide includes, in an upper surface thereof,
a first region that is included in an upper surface of the first immobilized layer and that is covered by the protective film,
a second region that includes at least a part of an upper surface of the second immobilized layer, and
a third region that is included in the upper surface of the first immobilized layer and that is positioned between the first region and the second region, and wherein a height of the third region as seen from the substrate surface is less than each of a height of the first region and a height of the second region.

4. The sensor device according to claim 1, further comprising:
a protective film that covers the first IDT electrode and the second IDT electrode,
wherein end portions of the first immobilized layer that are respectively adjacent to the first IDT electrode and the second IDT electrode are covered by the protective film, and
wherein end portions of the second immobilized layer that are respectively adjacent to the first IDT electrode and the second IDT electrode are positioned on an upper side of the protective film.

5. The sensor device according to claim 4, further comprising:
a close-contact layer positioned on the first immobilized layer,
wherein the protective film is positioned on the close-contact layer.

6. The sensor device according to claim 1, wherein the waveguide further includes a third immobilized layer positioned between the first immobilized layer and the second immobilized layer.

7. The sensor device according to claim 1, wherein the first immobilized layer includes a material that is the same as a material of the first IDT electrode.

8. The sensor device according to 1, wherein the first immobilized layer is connected to the first IDT electrode.

9. The sensor device according to claim 1, wherein the first immobilized layer is connected to the second IDT electrode.

10. The sensor device according to claim 1, wherein a thickness of the second immobilized layer is less than a thickness of the first immobilized layer.

11. The sensor device according to claim 1, wherein a surface roughness of the second immobilized layer is less than a surface roughness of the first immobilized layer.

12. The sensor device according to claim 1, wherein the second immobilized layer includes a material that is different from a material of the first immobilized layer.

13. A method of manufacturing a sensor device, comprising:
forming a metal layer on a substrate,
removing a part of the metal layer to form a first interdigital transducer (IDT) electrode, a second IDT electrode, and a first immobilized layer positioned between the first IDT electrode and the second IDT electrode, wherein the first immobilized layer has a recessed surface;
forming a protective film that covers the first IDT electrode, the second IDT electrode, and the first immobilized layer;
removing a part of the protective film to expose at least a part of the first immobilized layer; and
forming a second immobilized layer on at least a part of an exposed surface of the first immobilized layer, wherein the second immobilized layer is positioned on the recessed surface.

\* \* \* \* \*